Figure 1:
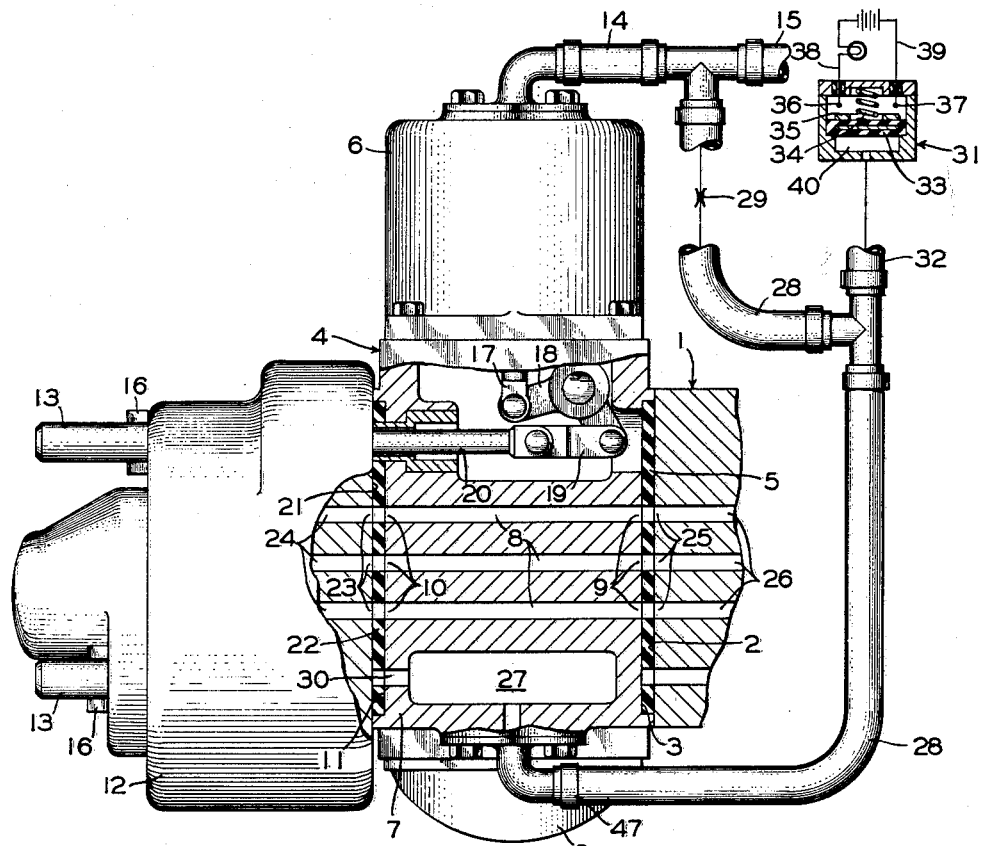

June 8, 1965 — W. P. SPALDING — 3,187,561
APPARATUS FOR CHECKING INTEGRITY OF A PNEUMATIC SEAL
Filed Feb. 27, 1962

INVENTOR.
Willard P. Spalding
BY
A. A. Steinmiller
Attorney

United States Patent Office 3,187,561
Patented June 8, 1965

3,187,561
APPARATUS FOR CHECKING INTEGRITY OF A PNEUMATIC SEAL
Willard P. Spalding, Pittsburgh, Pa., assignor to Westinghouse Air Brake Company, Wilmerding, Pa., a corporation of Pennsylvania
Filed Feb. 27, 1962, Ser. No. 176,022
4 Claims. (Cl. 73—46)

This invention relates to apparatus for checking the integrity of a fluid pressure seal and, more specifically, to such apparatus characterized by means for indicating whether or not a clamping surface of a valve device has made sealing engagement with a gasket on a test rack when the valve device is clamped against said gasket for testing the operational functions of the valve device.

In order to provide a higher degree of insurance against malfunctioning and failure of any type of mechanical equipment once it has been placed in service, it has become common practice to test such equipment under simulated service conditions to determine the serviceability thereof. This is particularly true of railway braking equipment, for example, and especially of the valve devices associated therewith. These tests may be carried out on a specially designed test rack on which the valve device to be tested is secured, after which the operator, through use of a control panel, causes the valve device to perform, under simulated service conditions, the various functions for which it is designed. A signal panel indicates, as each function is registered, whether the valve device being tested is functioning properly or not. If not, the particular malfunction is recorded and corrective measures are later taken to place the valve device in serviceable condition.

When tests of valve devices, as above described, are to be made, it is desirable to insure that the testing equipment used in making such tests be in the best possible operating condition so that the results of the tests are accurate and reliable. The valve devices to be tested may be of the type having a clamping face such as a fluid pressure operable brake control valve device, for example, used with railway vehicle fluid pressure braking equipment, by which clamping face the valve device, when in service, is clamped to a complementary clamping face of a pipe bracket fixed on the vehicle. The respective complementary clamping faces of the valve device and the pipe bracket are provided with a plurality of ports correspondingly situated on the respective faces so as to register, port for port, when the two components are clamped to each other, said ports connecting with respective passageways through which fluid under pressure may flow during operation of the equipment.

The testing equipment for testing the various brake control valve devices may comprise a test rack having a pipe bracket portion and a fluid pressure operable clamping device portion secured to said pipe bracket portion. The valve device to be tested is placed on the clamping device portion which has several fluid pressure operable clamping studs for holding the valve device in position while being tested. The clamping device portion has two oppositely arranged clamping faces, one of which complements the clamping face on the pipe bracket portion and the other of which complements the clamping face on the valve device being tested. Passageways formed in the clamping device portion provide for passage of fluid under pressure therethrough from the pipe bracket portion to the valve device to be tested. It is imperative that the respective complementary clamping faces make air-tight sealing contact to insure accurate test results of the devices being tested.

Accordingly, the object of the present invention is to provide apparatus whereby the integrity of the seal between the clamping face of the valve device to be tested and the complementary clamping face of the clamping device portion of the test rack and the seal between the other clamping face of the clamping device portion and the complementary clamping face on the pipe bracket may be ascertained before testing procedure is commenced. Briefly, the invention comprises a timing volume or reservoir of predetermined capacity connected in parallel relation in a closed fluid pressure supply circuit, such as the supply conduit by which fluid under pressure is supplied to operating cylinders of a fluid pressure operable clamping device comprising a component of the test rack or equipment for holding the device to be tested on the test rack. The timing volume is in communication with the sealing surfaces of the clamping faces provided by sealing gaskets interposed therebetween, and, therefore, in the absence of any leaks, fluid pressure in said timing volume builds up sufficiently, when pressurized fluid is being supplied through the supply conduit, to cause a fluid pressure responsive device, such as a fluid pressure operable electrical switch connected in the fluid pressure supply circuit to be operated to a position in which an electrical circuit is closed. The electrical circuit may be the control circuit for the test apparatus and, therefore, when closed renders the apparatus operable, or it may have a signal lamp which lights when the circuit is closed to indicate that there is no leakage at the seal.

Figure 2:
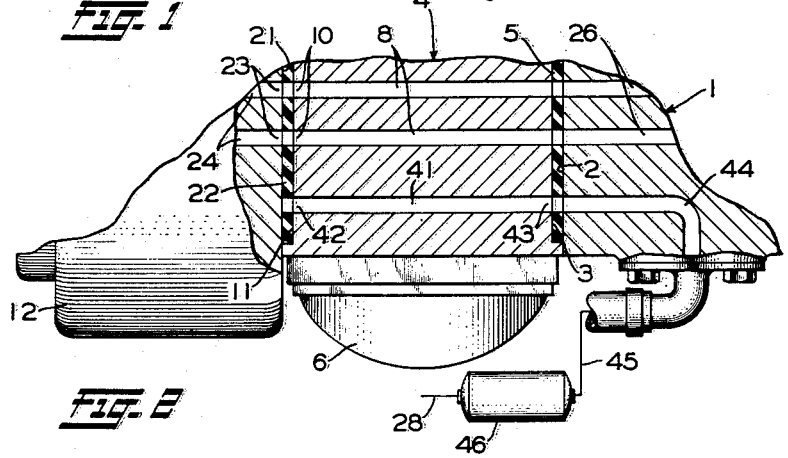

In the drawing, FIG. 1 shows a partly sectionalized diagrammatic view of a portion of a test rack embodying the invention, and FIG. 2 is a modified version of the invention as shown in FIG. 1.

*Description and operation*

In FIG. 1 of the drawing only a portion of a valve device testing apparatus is shown, because it is not deemed essential to show the complete apparatus for a thorough understanding of the invention. The apparatus, as shown, comprises a pipe bracket 1, only a portion of which is shown, said pipe bracket being removably secured, in suitable manner not shown, to the test apparatus or rack. The pipe bracket 1 is provided with a clamping face 2 against which a complementary clamping face 3 of a fluid pressure operable clamping device 4 is secured (by suitable means not shown) with a sealing gasket 5 inserted therebetween to provide an air-tight seal.

The fluid pressure operable clamping device 4 is described in greater detail in a copending United States patent application filed December 20, 1961, Serial No. 160,833, and assigned to the assignee of the present application. For an understanding of the present invention, it will suffice to say that the clamping device 4 comprises a plurality of fluid pressure responsive cylinder devices 6 radially disposed about a hub 7 through which hub a plurality of passageways 8 are provided. The passageways 8, which terminate at one end as respective ports 9 opening on clamping face 3 and at the other end as respective ports 10 opening to a second clamping face 11 formed on the side of the clamping device 4 opposite clamping face 3, provide for flow of fluid under pressure from the pipe bracket 1 to a valve device 12 which is to be tested.

The valve device 12 shown in the drawing may represent any form of valve device to be tested and, in itself, does not constitute a part of this invention. No particular identification or description, therefore, has been assigned to the valve device 12. The valve device 12 is mounted on the clamping device 4 by a plurality of receiving studs 13, the number of said studs and the spacing thereof on said clamping device corresponding to the number and spacing of bolt holes in the valve device 12, said bolt holes being normally used for mounting the valve device on the vehicle. After the valve device 12, which hereinafter may also be referred to as a "test piece," has been slid onto the receiving studs 13 of the clamping device 4, pressurized fluid is supplied to the cylinder devices 6 (one for each of said receiving studs), via a fluid pressure conduit 14 which is connected to a source of fluid under pressure such as a pressure fluid supply conduit 15. The manner in which the supply of pressurized fluid to the cylinder device 6 is effected is not pertinent to an understanding of this invention. The cylinder devices 6 respond to fluid pressure supplied thereto for effecting operation of respective latch members 16 associated with the receiving studs 13 to a transverse latching position, in which they are shown in the drawing, for retaining the test piece 12 in a testing position.

Each of the cylinder devices 6 has a piston therein (not shown) subjected to fluid pressure supplied to the cylinder device, whereby, acting through a connecting rod 17, a bell crank lever 18, a connecting link 19 and a pull rod 20, said piston serves to exert a force on the respective latch member 16 which, in turn, exerts said force against the test piece 12 to hold a clamping face 21 provided on said test piece against the clamping face 11 of the clamping device 4. The clamping face 21 of the test piece or valve device 12 serves to seal against a clamping face of the pipe bracket on the vehicle when said test piece or valve device is mounted on the vehicle. A gasket 22 is inserted between the clamping faces 11 and 21 to provide an air-tight seal therebetween. When fluid pressure is released from the cylinder devices 6, each of the latch members 16 is operated (in a manner not deemed pertinent to this invention) to a retracted position within the respective receiving studs 13 to permit the test piece 12 to be slid off said studs and removed from the test apparatus.

The ports 10 in the clamping device 4 register with a plurality of ports 23 opening to clamping face 21 and connecting with respective passageways 24 formed in the test piece 12, said ports 23 being correspondingly spaced as the ports 10 are on clamping face 11 so as to effect such registry. The testing apparatus for testing such valve devices as the test piece 12 is normally supplied with a number of interchangeable clamping devices such as the clamping device 4, each of which clamping devices is designed with the location of the ports opening on the clamping face, that is, the one against which the test piece is clamped, corresponding to the location of the ports opening on the clamping face of the particular test piece to be tested. Thus a variety of types of valve devices may be tested by mounting the appropriate clamping device on the pipe bracket 1 of the test rack corresponding to the type of test piece to be tested. The pipe bracket 1 is provided with sufficient ports 25 and connecting passageways 26 opening to and so situated on the clamping face 2 as to accommodate all the different clamping devices 4. Those ports in the pipe bracket 1 not required for the particular valve device being tested and, therefore, the clamping device for that particular valve device, are blanked off by the adjacent clamping face 3 of the clamping device being used and are thereby rendered ineffective. The passageways 8 in the clamping device 4 thus establish communication between the respective passageways 26 in the pipe bracket 1 and the respective passageways 24 in the test piece 12, thereby permitting fluid under pressure to be supplied to said test piece via said pipe bracket and released (from a source not shown) for testing purposes.

According to the embodiment of the invention as shown in FIG. 1, a timing volume or reservoir 27 of predetermined capacity is formed within the casing limits of the clamping device 4 and is connected via a fluid pressure conduit 28 to the supply conduit 15 with a choke 29 of predetermined flow capacity interposed in said conduit 28. The volume 27 is in communication with both sides or contact surfaces of the gasket 22 adjacent the clamping faces 11 and 21 by way of an opening 30 extending from said volume to a correspondingly situated opening extending through said gasket. A fluid pressure responsive electrical switch device 31 is connected, via a fluid pressure branch conduit 32, to the conduit 28 at a point between the choke 29 and the volume 27.

The pressure switch device 31 is of the usual type having a piston 33 which is biased by a spring 34 toward an open position in which a switch member 35 carried by said piston is out of contact with two terminals 36 and 37 to which respective circuit wires 38 and 39 are connected. When the piston 33 is subjected to fluid at a pressure above a certain value in a chamber 40 in the switch device 31, said piston is actuated by said fluid, against the opposing force of spring 34, to a closed position in which the switch member 35 is in contact with terminals 36 and 37 for effecting an electrical connection between said terminals and, therefore, between the wires 38 and 39. The wires 38 and 39 are components of a circuit, of which only a portion is shown and which may have a signal lamp serially connected therein, said lamp lighting up when the circuit is closed for a purpose to be hereinafter explained.

The primary purpose of the timing volume 27 is to supplement the combined volumes of chamber 40 and of conduit 28 on the side of choke 29 adjacent said timing volume to thereby provide sufficient volume in which fluid pressure supplied through said choke may build up gradually, in the event the gasket 22 does not leak. Without the additional volume 27, the volumes of conduit 28 and chamber 40 alone may be so small as to cause sudden or untimely build-up of fluid pressure therein and, therefore, erratic or untimely operation of the switch 31.

In operation, assuming that the test piece 12 has been placed on the receiving studs 13, pressurized fluid is supplied to conduit 14 and thereby to the cylinder devices 6 for latching said test piece into position for testing, as above described. Assuming that an air-tight seal is effected between the clamping faces 11 and 21 and the gasket 22, fluid under pressure, when supplied to conduit 14, concurrently flows through conduit 28 to chamber 40 (via conduit 32) of the switch device 31 and to gasket 22 via conduit 28, volume 27 and opening 30. Since it is assumed that there is no leakage at the gasket 22 between the test piece 12 and the clamping device 4, fluid pressure in volume 27 as well as in chamber 40 of the switch device 31 builds up at a rate determined by the flow capacity of choke 29 until such build-up in chamber 40 is sufficient for overcoming the opposing force of spring 34 thereby operating piston 33 to its closed position. The circuit comprising the switch member 35 and the wires 38 and 39 is thus closed to cause the signal lamp to light and thereby indicate that the test piece 12 is in proper position to be tested. The time required for build-up of fluid pressure in timing volume 27 provides a gradual build-up of fluid pressure in conduits 28 and 32 and in chamber 40 of the switch device 31, thereby insuring against untimely or premature and unnecessary operation of said switch device.

It should be apparent that the circuit including switch member 35 and the wires 38 and 39, be with or without a signal lamp therein, may provide an interlock enabling the testing apparatus to be operated or rendering the testing apparatus inoperable, depending on the switch member being in closed or open positions, respectively.

Let it now be assumed that, when pressurized fluid is supplied to conduit 14 for operating the cylinder devices 6, there is leakage of fluid pressure at the gasket 22 due to improper seating of the mating portions of the metallic clamping faces 21 and 11 of the test piece 12 or the hub 7, or due to improper seating of the clamping faces 11 and 21 on said gasket, such as might be caused by a foreign object being lodged between said clamping faces or between either one or both of the clamping faces and the gasket. Even though pressurized fluid thus escapes to atmosphere past the gasket 22, the choke 29 acts to prevent dissipation of pressurized fluid from the supply conduit 15 at such a rate as not to permit sufficient supply of fluid under pressure to flow to the cylinder devices 6 for effecting operation thereof.

If there is a leak at the gasket 22, however, and if such leakage were in excess of a certain critical rate, that is, a rate of leakage exceeding the rate of flow through choke 29, fluid pressure in volume 27, in conduit 28 on the side of choke 29 opposite supply conduit 15 and, therefore, in chamber 40 of the pressure switch device 31 would fail to build up sufficiently for causing the piston 33 to move switch member 35 to its closed position to close the electrical circuit indicating that testing procedure could be initiated. If the leakage at gasket 22 were at a rate below the critical rate, fluid pressure would build up in volume 27 and also in chamber 40 of the switch device 31 for closing the switch member 35, whereby, due to the insignificance of such leakage, the electrical control circuit would be closed as if there were no leakage.

In the modified version of the invention, as shown in FIG. 2, the volume 27 in the clamping device 4 is replaced by a passageway 41 terminating at one end with a port 42 opening on clamping face 11 to register with an opening in gasket 22, whereby said passageway is in communication with both sides of said gasket. The other end of passageway 41 terminates with a port 43 opening to clamping face 3 and communicating, through an opening formed in gasket 5, with one end of a passageway 44 formed in the pipe bracket 1. The other end of passageway 44 is connected to one end of fluid pressure conduit 45, the other end of said conduit being connected to a timing volume or reservoir 46 to which the conduit 28 is connected. The timing volume 46 in FIG. 2 replaces the timing volume 27 in FIG. 1 and serves a similar purpose.

With the arrangement, as shown in FIG. 1, it is necessary to disconnect conduit 28, such as by a union fitting 47, each time the clamping device 4 is changed when a different type test piece is to be tested, as above explained. Thus, by locating the timing volume 46 outside of the clamping device 4 and connecting it to the pipe bracket 1, through which communication to the sealing areas is provided, the necessity of disconnecting conduit 28 each time the clamping device 4 is changed is eliminated. Moreover, since the communication between passageways 41 and 44 passes through the gasket 5 also, the integrity of the seal at both gaskets 22 and 5 can be checked simultaneously. It should also be apparent that an integrally formed timing volume could be provided within the casing limits of the pipe bracket 1, similarly to the timing volume 27 in the clamping device 4, by expanding the volume of passageway 44, thereby eliminating the separate exteriorly located volume 46. The modified version of the invention shown in FIG. 2 functions in a manner similar to that above described in connection with the version shown in FIG. 1.

Having now described the invention, what I claim as new and desire to secure by Letters Patent, is:

1. Apparatus for checking the integrity of a seal provided by a sealing gasket interposed between two members having communicating passages for the supply of fluid under pressure from one member to the other, said apparatus comprising a fluid pressure supply conduit, a reservoir, a restricted passage via which fluid under pressure is supplied from said conduit to said reservoir at a selected uniform rate, a passage in one of said members connecting said reservoir to at least one face of said gasket via which fluid pressure in said reservoir may leak away at varying rates in the event the seal between said gasket and the face of said one member is faulty, the fluid pressure established in said reservoir being dependent upon the rates of leakage of fluid pressure therefrom relative to the rate of supply of fluid pressure thereto and increasing to above a predetermined pressure only when the leakage rate is relatively low compared to the supply rate of fluid pressure, pressure responsive means subject to the pressure of the fluid in said reservoir, and signal means controlled by said pressure responsive means and operated only when the pressure established in said reservoir exceeds a certain pressure indicative that the seal between said gasket and said one member is satisfactory.

2. Apparatus for checking the integrity of at least two seals provided by a corresponding number of sealing gaskets interposed between respective mating clamping faces of a plurality of members having inter-communicating passages for the supply of fluid under pressure among the several members, said apparatus comprising a fluid pressure supply conduit, a reservoir, a restricted passage via which fluid under pressure is supplied from said conduit to said reservoir at a selected uniform rate, a continuous passage extending through said members for connecting said reservoir to the sealing faces of said gaskets via which continuous passage fluid pressure in said reservoir may leak away at varying rates in the event any of the seals between said gaskets and the respective adjacent clamping faces of said members is faulty, the fluid pressure established in said reservoir being dependent upon the rates of leakage of fluid pressure therefrom relative to the rate of supply of fluid pressure thereto and increasing to above a pretermined pressure only when the leakage rate is relatively low compared to the supply rate of fluid pressure, pressure responsive means subject to the pressure of fluid in said reservoir, and signal means controlled by said pressure responsive means and operated only when the pressure established in said reservoir exceeds a certain pressure indicative that the seals between the gaskets and the respective clamping faces of said members are satisfactory.

3. In combination, two mating members having communicating passages for supply of fluid under pressure from one member to the other, a sealing gasket interposed between said two members for providing a fluid pressure seal therebetween, and apparatus for checking the integrity of said seal, said apparatus comprising a fluid pressure supply conduit, a reservoir, a restricted passage via which fluid under pressure is supplied from said conduit to said reservoir at a selected uniform rate, a passage in one of said members connecting said reservoir to at least one face of said gasket via which fluid pressure in said reservoir may leak away at varying rates in the event the seal between said gasket and the face of said one member is faulty, the fluid pressure established in said reservoir being dependent upon the rates of leakage of fluid pressure therefrom relative to the rate of supply of fluid pressure thereto and increasing to above a predetermined pressure only when the leakage rate is relatively low compared to the supply rate of fluid pressure, pressure responsive means subject to the pressure of the fluid in said reservoir, and signal means controlled by said pressure responsive means and operated only when the pressure established in said reservoir exceeds a certain pressure indicative that the seal between said gasket and said one member is satisfactory.

4. The combination as defined in claim 3 further characterized in that said reservoir is formed as a chamber within one of said two mating members.

References Cited by the Examiner

UNITED STATES PATENTS

| | | | |
|---|---|---|---|
| 2,103,305 | 12/37 | Thomas | 73—39 |
| 2,976,718 | 3/61 | Baker | 73—37.5 |
| 3,039,295 | 6/62 | Le Mat et al. | 73—49.2 |
| 3,041,834 | 7/62 | Davies et al. | 73—46 X |

FOREIGN PATENTS 851,118  10/60  Great Britain.

ISAAC LISANN, *Primary Examiner.*